(12) United States Patent
Fujimura et al.

(10) Patent No.: US 8,765,037 B2
(45) Date of Patent: Jul. 1, 2014

(54) PROCESS FOR PREPARING ETHYLENE-VINYL ALCOHOL COPOLYMER COMPOSITION, AND PROCESS FOR PRODUCING ETHYLENE-VINYL ALCOHOL COPOLYMER PELLETS

(75) Inventors: Keisuke Fujimura, Osaka (JP); Yasufumi Beniya, Osaka (JP); Akio Harao, Osaka (JP); Yoshiharu Nagao, Osaka (JP); Shinji Okamoto, Osaka (JP)

(73) Assignee: The Nippon Synthetic Chemical Industry Co., Ltd., Osaka-shi (JP)

( * ) Notice: Subject to any disclaimer, the term of this patent is extended or adjusted under 35 U.S.C. 154(b) by 438 days.

(21) Appl. No.: 12/810,463

(22) PCT Filed: Dec. 22, 2008

(86) PCT No.: PCT/JP2008/073330
§ 371 (c)(1), (2), (4) Date: Aug. 23, 2010

(87) PCT Pub. No.: WO2009/084509
PCT Pub. Date: Jul. 9, 2009

(65) Prior Publication Data
US 2010/0314791 A1  Dec. 16, 2010

(30) Foreign Application Priority Data

Dec. 28, 2007 (JP) .................... 2007-338473
May 30, 2008 (JP) .................... 2008-141951

(51) Int. Cl.
*B29B 9/12* (2006.01)

(52) U.S. Cl.
USPC ......................................... 264/142

(58) Field of Classification Search
USPC ......................................... 264/142
See application file for complete search history.

(56) References Cited

U.S. PATENT DOCUMENTS

| | | | |
|---|---|---|---|
| 6,686,405 B1 | 2/2004 | Kawahara | |
| 2002/0026007 A1 | 2/2002 | Yanagida | |
| 2002/0028871 A1 | 3/2002 | Kawahara | |
| 2002/0037971 A1 | 3/2002 | Kawahara | |
| 2002/0100997 A1 | 8/2002 | Kawahara | |
| 2002/0143098 A1 | 10/2002 | Kawai | |
| 2004/0019151 A1 | 1/2004 | Kawahara | |
| 2004/0082690 A1 | 4/2004 | Kawahara | |
| 2005/0032955 A1* | 2/2005 | Nakano et al. ............... | 524/394 |
| 2005/0228129 A1 | 10/2005 | Tsai | |
| 2006/0108703 A1 | 5/2006 | Uchiumi | |

FOREIGN PATENT DOCUMENTS

| | | |
|---|---|---|
| EP | 1 179 546 | 2/2002 |
| JP | 11-80253 | 3/1999 |
| JP | 11-152307 | 6/1999 |
| JP | 2001-11191 A1 | 1/2001 |
| JP | 2001-96529 A1 | 4/2001 |
| JP | 2001-96530 A1 | 4/2001 |
| JP | 2001-96606 A1 | 4/2001 |
| JP | 2001-98077 A1 | 4/2001 |
| JP | 2001-98080 A1 | 4/2001 |
| JP | 2002-12618 A1 | 1/2002 |
| JP | 2002-80605 A1 | 3/2002 |
| JP | 2002-80606 A1 | 3/2002 |
| JP | 2002-121216 A1 | 4/2002 |
| JP | 2002-121290 A1 | 4/2002 |
| JP | 2002-284811 A1 | 10/2002 |
| JP | 2002-284886 A1 | 10/2002 |
| JP | 2002-284887 A1 | 10/2002 |
| JP | 2002-284888 A1 | 10/2002 |
| JP | 2002-293948 A1 | 10/2002 |
| JP | 2005-329718 A1 | 12/2005 |
| JP | 2005-538243 A1 | 12/2005 |
| JP | 2006-83400 A1 | 3/2006 |
| JP | 2006-97033 A1 | 4/2006 |
| JP | 2006-104482 A1 | 4/2006 |
| JP | 2007-63428 A1 | 3/2007 |
| WO | WO 2004/009313 A1 | 1/2004 |

OTHER PUBLICATIONS

International Search Report for International Application No. PCT/JP2008/073330 dated Feb. 18, 2009.
Extended European Search Report dated Dec. 6, 2010.

* cited by examiner

*Primary Examiner* — Ryan Ochylski
(74) *Attorney, Agent, or Firm* — Kratz, Quintos & Hanson, LLP

(57) ABSTRACT

An ethylene-vinyl alcohol copolymer (EVOH) composition preparation process is provided, which comprises the steps of: feeding an EVOH alcohol solution into a tower type apparatus, the EVOH alcohol solution comprising 100 parts by weight of an EVOH and not less than 300 parts by weight of an alcohol having a carbon number of not greater than 4; bringing the EVOH alcohol solution into contact with water, and feeding out a part of the alcohol together with water from the apparatus to provide an EVOH water/alcohol mixture solution comprising 100 parts by weight of the EVOH, 10 to 200 parts by weight of the alcohol and 50 to 200 parts by weight of water; bringing the EVOH water/alcohol mixture solution into contact with water in an agitator container with stirring, and feeding out a part or all of the alcohol together with water from the container to provide an EVOH composition comprising 100 parts by weight of the EVOH, less than 10 parts by weight of the alcohol and 20 to 100 parts by weight of water. This preparation process makes it possible to efficiently replace the alcohol in the EVOH alcohol solution with water to provide a lower water content EVOH composition.

14 Claims, No Drawings

PROCESS FOR PREPARING ETHYLENE-VINYL ALCOHOL COPOLYMER COMPOSITION, AND PROCESS FOR PRODUCING ETHYLENE-VINYL ALCOHOL COPOLYMER PELLETS

TECHNICAL FIELD

The present invention relates to a process for preparing an ethylene-vinyl alcohol copolymer (hereinafter abbreviated as "EVOH") composition and, more specifically, to the step of, after providing an EVOH alcohol solution by saponifying a copolymer of ethylene and a fatty acid vinyl ester in an alcohol, replacing apart or all of the alcohol in the EVOH alcohol solution with water in the EVOH preparing process.

The present invention further relates to a process for producing EVOH pellets by melt-kneading the thus prepared EVOH composition by means of an extruder, extruding the EVOH composition, and cutting the extruded EVOH composition.

BACKGROUND OF THE INVENTION

EVOH is excellent in transparency, gas barrier property (oxygen barrier property and the like), aroma retaining property, solvent resistance, oil resistance, mechanical strength and the like, and are typically formed into films, sheets, bottles and the like, which are widely used for packaging materials such as food packaging materials, medical drug packaging materials, industrial chemical packaging materials, agricultural chemical packaging materials.

Such an EVOH is typically prepared by preparing an ethylene-vinyl ester copolymer through copolymerization of ethylene and a fatty acid vinyl ester such as vinyl acetate, and saponifying the ethylene-vinyl ester copolymer in an alcohol solvent such as methanol in the presence of an alkali catalyst under higher-temperature higher-pressure conditions.

It is a conventional practice to convert the EVOH alcohol solution prepared under the higher-temperature higher-pressure conditions through the saponification into an EVOH water/alcohol mixture solution which is stable at an ordinary pressure, extrude the EVOH water/alcohol mixture solution in a coagulation bath mainly containing water at a lower temperature for solidification in the form of strands, cut the strands for pelletization, and dry the resulting pellets to provide a product.

In this EVOH preparation process, however, the alcohol is liable to run into the coagulation bath when the EVOH water/alcohol solution is extruded into the strands in the coagulation bath. The alcohol is evaporated in air, thereby impairing a working environment.

To solve this problem, there have been proposed: an EVOH resin production process (see, for example, Patent Document 1) which includes the steps of feeding an EVOH alcohol solution into an apparatus and bringing the EVOH alcohol solution into contact with water in the apparatus to replace the alcohol with water to provide an EVOH composition having a lower alcohol content (Step 1), and melt-kneading the EVOH composition by means of an extruder to provide an EVOH resin (Step 2); and an EVOH pellet production process (see, for example, Patent Document 2) which includes the steps of feeding an EVOH alcohol solution into an apparatus and bringing the EVOH alcohol solution into contact with water in the apparatus to replace the alcohol with water to provide an EVOH composition (Step 1), pelletizing the EVOH composition (Step 2), drying the resulting pellets (Step 3), melt-kneading the pellets having a reduced water content by means of an extruder (Step 4), and cutting an EVOH extruded from the extruder into pellets (Step 5).

These production processes make it possible to recover the alcohol removed from the EVOH alcohol solution without emanation of the alcohol, thereby eliminating the possibility of impairing the working environment.

Patent Document 1: JP-A-2002-284811 (US2002/100997A1)

Patent Document 2: WO2004/009313 (US2006/108703A1)

As specified in Patent Document 1, the EVOH composition provided in Step 1 of the production process disclosed in Patent Document 1 has a water content of 10 to 1000 parts by weight based on 100 parts by weight of the EVOH and, if the water content is less than 10 parts by weight, the EVOH composition has unsatisfactory fluidity in the container. A preferred example of the apparatus for use in Step 1 is a tower type apparatus which ensures efficient replacement of the alcohol with water, continuous processing and excellent productivity. Where the tower type apparatus is used in Step 1, however, the unsatisfactory fluidity makes it difficult to fluidize the EVOH composition in the apparatus and feed out the EVOH from the apparatus. Therefore, if the alcohol content is reduced to 0 to 10 parts by weight based on 100 parts by weight of the EVOH, it is difficult to reduce the water content to 100 parts by weight or less. In examples shown in Patent Document 1, the water content of the EVOH composition is 105 parts by weight based on 100 parts by weight of the EVOH, because the tower type apparatus is used. Therefore, the EVOH composition thus having a higher water content should be subsequently melt-kneaded in Step 2. This results in separation of water during the feeding of the EVOH composition into the extruder and unstable kneading. Since a greater amount of water is evaporated, the extruder requires a plurality of vents, or requires a higher L/D ratio or a lower extrusion rate to increase a retention time during which the EVOH composition is retained in the extruder in order to sufficiently remove the water. This disadvantageously increases the costs of the apparatus, and fails to increase the productivity.

The process according to the invention disclosed in Patent Document 2, which aims to alleviate this problem, includes the step of pelletizing the higher water content EVOH composition prepared in Step 1 and drying the resulting pellets between Step 1 and Step 2 of the process disclosed in Patent Document 1, so that an EVOH composition having a reduced water content is melt-kneaded in the subsequent step. However, the process disclosed in Patent Document 2 requires a device for pelletizing the EVOH composition prepared in Step 1, and a device for drying the resulting pellets, thereby leading to disadvantageous production costs.

Further, the drying step requires a great amount of heat for the removal of the great amount of water contained in the EVOH, and is liable to thermally degrade the EVOH pellets retained in a dryer for a long period of time. This increases the possibility of contaminating a product with foreign matter of the thermally degraded EVOH.

BRIEF SUMMARY OF THE INVENTION

It is therefore an object of the present invention to provide an EVOH preparation process which ensures that the replacement of the alcohol with the water and the reduction of the water content can be efficiently achieved in the step of replacing the alcohol with the water in the EVOH alcohol solution prepared by saponifying the ethylene-vinyl ester copolymer to provide a lower water content EVOH composition without the thermal drying.

In view of the foregoing, the inventors conducted intensive studies and, as a result, found that the object described above is attained by an EVOH composition preparation process, which comprises the steps of: feeding an EVOH solution into a tower type apparatus, the EVOH solution comprising 100 parts by weight of an EVOH prepared in a saponification step of an EVOH preparation process and not less than 300 parts by weight of an alcohol having a carbon number of not greater than 4; bringing the EVOH solution into contact with water, and feeding out apart of the alcohol together with water from the apparatus to provide an EVOH water/alcohol mixture solution comprising 100 parts by weight of the EVOH, 10 to 200 parts by weight of the alcohol and 50 to 200 parts by weight of water; bringing the EVOH water/alcohol mixture solution into contact with water in an agitator container with stirring, and feeding out most of a residual part of the alcohol from the container to provide an EVOH composition comprising 100 parts by weight of the EVOH, less than 10 parts by weight of the alcohol and 20 to 100 parts by weight of water. Thus, the inventor completed the present invention.

That is, a feature of the present invention is that the alcohol in the EVOH alcohol solution prepared in the saponification step is first replaced with water in the tower type apparatus, and further replacement of the alcohol with water is efficiently achieved by stirring the EVOH water/alcohol mixture solution to efficiently reduce the water content.

Particularly, the alcohol is not completely removed in the tower type apparatus to maintain the fluidity of the solution, thereby preventing the reduction in processing efficiency. Then, the EVOH water/alcohol mixture solution is brought into contact with water in the agitator container with forcible stirring, whereby the alcohol-water replacement efficiently proceeds even in a higher-concentration higher-viscosity system. As a result, the EVOH, which has been swelled with the alcohol, shrinks as the alcohol content is reduced. Further, water is removed together with the alcohol from the resin. Thus, the lower water content EVOH composition is provided.

It is difficult to prepare a lower water content and lower alcohol content EVOH composition as prepared in the present invention only with the use of the tower type apparatus. This is because the EVOH solution has an excessively high viscosity and, hence, a lower fluidity and a lower replacement efficiency in a latter half of the tower and, therefore, cannot be fed out of the apparatus. Further, it is impractical to replace most of the alcohol in the EVOH alcohol solution with water only with the use of the agitator container. This is because the EVOH solution initially has a lower viscosity and, therefore, cannot retain the introduced water for a long period of time to reduce the replacement efficiency, thereby requiring a longer process time and a greater amount of water.

DETAILED DESCRIPTION OF THE INVENTION

In the inventive preparation process, it is possible to efficiently replace the alcohol in the EVOH alcohol solution with water, and to efficiently provide the lower water content EVOH composition. For the melt-kneading and the pelletization of the EVOH composition, there is no need to use a special extruder such as having a higher L/D ratio. Even without a preparatory drying process, it is possible to use an ordinary extruder. Where the lower water content EVOH composition is extruded in a coagulation bath to be solidified into strands, the solidification efficiently proceeds. Therefore, the processing efficiency is expected to be improved.

BEST MODE FOR CARRYING OUT THE INVENTION

The following description pertains to one exemplary embodiment (typical embodiment) of the present invention, and the present invention is not limited to this embodiment.

The present invention will hereinafter be described in detail.

First, an EVOH to be used in the present invention will be described.

The EVOH to be used in the present invention contains essentially an ethylene structural unit and a vinyl alcohol structural unit, and further contains a smaller amount of a vinyl ester structural unit depending on the saponification degree thereof. The EVOH is typically prepared by saponifying an ethylene-vinyl ester copolymer prepared by copolymerizing a fatty acid vinyl ester such as vinyl acetate with ethylene.

The EVOH typically has an ethylene content of 2 to 80 mol %.

Particularly, where the EVOH is required to have melt-formability, the EVOH typically has an ethylene content of 10 to 60 mol %, preferably 20 to 55 mol %, particularly preferably 25 to 50 mol %. If the ethylene content is too low, the thermal decomposition temperature of the EVOH is excessively close to the melting point of the EVOH, so that the EVOH is poorer in melt-formability. If the ethylene content is too high, on the other hand, the EVOH tends to have a poorer gas barrier property.

Where the EVOH is used in the form of a water soluble resin, the EVOH typically has an ethylene content of 2 to 20 mol %, preferably 3 to 10 mol %. If the ethylene content is too high, the water solubility of the EVOH tends to be reduced. The EVOH thus having a lower ethylene content is used in the form of an aqueous solution, which serves as a coating agent for formation of a gas barrier coating film.

A vinyl acetate component in the EVOH typically has a saponification degree of not lower than 80 mol %. Where the gas barrier property is required, the saponification degree is preferably higher, typically not lower than 95 mol %, more preferably not lower than 98 mol %. If the saponification degree is too low, the gas barrier property and the hygroscopic resistance tend to be deteriorated.

The polymerization degree of the EVOH is properly selected depending on applications. Where the EVOH is to be melt-formed, the EVOH typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR is too low, it is difficult to extrude the EVOH with a higher torque in the extruder during the melt-forming. If the MFR is too high, on the other hand, it is difficult to improve the accuracy of the thickness of a sheet or a film melt-formed from the EVOH.

The EVOH is typically prepared by saponifying an ethylene-vinyl ester copolymer prepared by copolymerizing a fatty acid vinyl ester compound and ethylene. The ethylene-vinyl ester copolymer is prepared by a known polymerization method such as solution polymerization, suspension polymerization, emulsion polymerization or bulk polymerization. Particularly, the solution polymerization is preferred.

Preferred examples of the fatty acid vinyl ester compound include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate, among which vinyl acetate is economically preferred.

Ethylene is introduced into the copolymer through ordinary ethylene pressure polymerization, and the amount of ethylene to be introduced is controlled by the pressure of ethylene. The pressure of ethylene is selected from the range of 25 to 80 kg/cm$^2$, depending on a desired ethylene content.

A copolymerizable ethylenically unsaturated monomer maybe used in addition to ethylene and the fatty acid vinyl ester compound for the copolymerization, as long as the properties required for the EVOH are not impaired. Examples of the monomer include: olefins such as propylene, 1-butene and isobutene; hydroxyl-containing α-olefins such as 3-buten-1-ol, 4-penten-1-ol, 5-hexen-1-ol, 3,4-dihydroxy-1-butene and 5-hexene-1,2-diol, and esterification products and other derivatives thereof such as 3,4-diacetoxy-1-butene; unsaturated acids such as acrylic acid, methacrylic acid, crotonic acid, (anhydrous) phthalic acid, (anhydrous) maleic acid and (anhydrous) itaconic acid, and salts thereof and $C_{1-18}$ monoalkyl or dialkyl esters thereof; acrylamides such as acrylamide, $C_{1-18}$ N-alkylacrylamides, N,N-dimethylacrylamide, 2-acrylamidepropanesulfonic acid and salts thereof, and acrylamidepropyldimethylamine, acid salts thereof and quaternary salts thereof; methacrylamides such as methacrylamide, $C_{1-18}$ N-alkylmethacrylamides, N,N-dimethylmethacrylamide, 2-methacrylamidepropanesulfonic acid and salts thereof, and methacrylamidepropyldimethylamine, acid salts thereof and quaternary salts thereof; N-vinylamides such as N-vinylpyrrolidone, N-vinylformamide and N-vinylacetamide; vinyl cyanates such as acrylonitrile and methacrylonitrile; vinyl ethers such as $C_{1-18}$ alkyl vinyl ethers, hydroxyalkyl vinyl ethers and alkoxyalkyl vinyl ethers; halogenated vinyls such as vinyl chloride, vinylidene chloride, vinyl fluoride, vinylidene fluoride and vinyl bromide; vinylsilanes such as trimethoxyvinylsilane; and allyl acetate, allyl chloride, allyl alcohol, dimethylallyl alcohol, and trimethyl-(3-acrylamide-3-dimethylpropyl)ammonium chloride, acrylamide-2-methylpropanesulfonic acid, vinylethylene carbonate, and glycerol monoallyl ether.

A solvent to be used for the solution polymerization should be capable of dissolving ethylene, the fatty acid vinyl ester compound, and the ethylene-vinyl ester copolymer as a polymerization product. Examples of the solvent include alcohols having a carbon number of not greater than 4. Specific examples of the solvent include methanol, ethanol, n-propyl alcohol, isopropyl alcohol and t-butyl alcohol, among which methanol is particularly preferred.

Then, the resulting copolymer is saponified. The saponification is achieved in such a state that the copolymer prepared in the aforementioned manner is dissolved in an alcohol having a carbon number of not greater than 4 or a hydrous alcohol in the presence of an alkali catalyst or an acid catalyst. Examples of the alcohol having a carbon number of not greater than 4 include methanol, ethanol, propanol and tert-butanol. Where the same solvent is used for the polymerization and for the saponification, a recovery/recycle process can be facilitated without the need for replacement of the solvent. As in the polymerization, methanol is particularly preferred as the solvent.

Examples of the catalyst to be used for the saponification include alkali catalysts including hydroxides and alcoholates of alkali metals such as sodium hydroxide, potassium hydroxide, sodium methylate, sodium ethylate, potassium methylate and lithium methylate, and acid catalysts such as sulfuric acid, hydrochloric acid, nitric acid, methasulfonic acid, zeolites and cation-exchange resins, among which sodium hydroxide is typically used.

Although the saponification reaction can be achieved by a known method, it is preferred to carry out the saponification under higher-temperature higher-pressure conditions with the use of a tower type apparatus. This is because the amount of the alkali catalyst to be used for the saponification can be reduced and the saponification reaction can proceed highly efficiently. As a result, the EVOH is fed out of the reaction system in the form of an alcohol solution at a higher temperature and a higher pressure after the saponification.

Next, an inventive preparation process will be described in detail, in which the alcohol in the EVOH alcohol solution is replaced with water to provide a lower water content EVOH composition.

The production process includes: the steps of feeding the EVOH alcohol solution into the tower type apparatus and bringing the EVOH alcohol solution into contact with water to replace a part of the alcohol with water to provide an EVOH water/alcohol solution; and bringing the EVOH water/alcohol solution into contact with water in an agitator container to replace most of the remaining alcohol with water. Thus, a major feature of the present invention is that the replacement of the alcohol with water is achieved in two stages.

First, the alcohol-water replacement step will be described, which is a preliminary step to be performed in the tower type apparatus.

The EVOH alcohol solution to be used in this step typically contains 100 parts by weight of the EVOH, and not less than 300 parts by weight, particularly preferably 400 to 900 parts by weight, of the alcohol having a carbon number of not greater than 4. If the alcohol content is too great, the replacement of the alcohol with water requires a longer period of time, thereby reducing the productivity. If the alcohol content is too small, on the other hand, the solution has a higher viscosity. In this case, the efficiency of the replacement with water is reduced, and gelation is liable to occur in the tower. The EVOH alcohol solution provided in the saponification step is preferably used as it is. If the alcohol content of the EVOH alcohol solution falls outside the aforementioned range, the alcohol content may be properly controlled by adding the alcohol, or removing the alcohol by heating or the like. A small amount of water may be added to the EVOH alcohol solution in this stage, and a known method may be employed for the addition of the water.

Examples of the tower type apparatus to be used in this step include plate towers such as perforated-plate towers and bubble cap towers, and packed towers. Where the solution has a higher viscosity like a polymer solution, the plate towers are preferred for the processing efficiency, and the perforated-plate towers are particularly preferred. Such a plate tower typically has 2 to 20 plates, particularly preferably 5 to 15 plates. Alternatively, a tower having efficiency comparable or superior to that of the plate tower may be used.

The EVOH alcohol solution and water are fed into the tower type apparatus to be brought into contact with each other, whereby a part of the alcohol is replaced with water. Thus, an EVOH water/alcohol solution and a mixture of water and the alcohol are fed out of the tower type apparatus. The EVOH alcohol solution and the water may be brought into counter flow contact or parallel flow contact with each other, but are preferably brought into counter flow contact with each other for the replacement efficiency.

Preferred examples of the water include hot water and water vapor. Particularly, the water vapor is preferably fed into the apparatus.

Feed-in positions at which the EVOH alcohol solution and the water are to be respectively fed into the tower type apparatus, and feed-out positions at which the EVOH water/alcohol mixture solution and the water/alcohol mixture are to be respectively fed out of the tower type apparatus are not particularly limited. For example, it is preferred to feed the EVOH alcohol solution and the water vapor into the tower type apparatus at a tower top and at a tower bottom, respectively, to bring the EVOH alcohol solution and the water vapor into counter flow contact with each other, then feed out the alcohol vapor together with the water vapor from the tower top, and feed out the EVOH water/alcohol solution from the tower bottom.

Where the plate tower is used, the EVOH alcohol solution feed-in position is located at a level that is lower than the tower top by two to four stages. Water layers are preferably formed on plates located above this feed-in position by feeding water onto these plates and/or by controlling the amount of the water vapor to be fed out. This prevents droplets of the EVOH and the like from being incorporated in the water/alcohol vapor mixture to be fed out from the tower top, thereby preventing contamination of a vapor transport pipe and a condenser. The water vapor feed-in position is typically located at the tower bottom, but maybe located at a level that is upper than the tower bottom by one to two stages. The alcohol/water vapor mixture fed out of the tower is liquefied with the use of a condenser to be separated and refined for recycling.

The EVOH water/alcohol solution fed out of the tower type apparatus after this step contains the alcohol in a proportion of 10 to 200 parts by weight, particularly 20 to 150 parts by weight, preferably 30 to 100 parts by weight, based on 100 parts by weight of the EVOH. Further, the EVOH water/alcohol solution contains water in a proportion of 50 to 200 parts by weight, particularly 50 to 150 parts by weight, preferably 60 to 100 parts by weight, based on 100 parts by weight of the EVOH.

If the alcohol content and the water content are too high, the subsequent stirring/replacement step disadvantageously becomes burdensome. If the alcohol content and the water content are too low, the EVOH water/alcohol solution has a higher viscosity, thereby reducing the replacement efficiency in the latter half of the tower type apparatus. Further, it is difficult to feed out the EVOH water/alcohol solution from the tower type apparatus.

The alcohol content and the water content of the EVOH water/alcohol solution to be fed out of the tower type apparatus are controlled by controlling the amount of water (water vapor) to be introduced into the EVOH alcohol solution fed into the apparatus, the internal temperature and pressure of the tower, and the like. Although the alcohol content and the water content of the EVOH water/alcohol solution depend on the number of the plates, the ratio of the sectional area to the length of the tower, the diameter and the number of perforations of each of the plates, the following exemplary conditions are preferably employed.

For example, the water vapor and the EVOH solution are typically fed into the tower type apparatus in a weight ratio of 0.01 to 30, preferably 0.05 to 10, more preferably 0.07 to 5. If the amount of the water vapor to be fed is too small, the efficiency of the replacement of the alcohol is reduced. If the amount of the water vapor to be fed is too great, on the other hand, disadvantageous costs will result. The alcohol/water vapor mixture previously fed out of the tower may be refined for recycling to provide the water vapor. A water vapor mixture containing a small amount of the alcohol may also be used. The alcohol content of the water vapor mixture is preferably not greater than 10 parts by weight based on 100 parts by weight of the water vapor, and is preferably smaller, ideally zero, for the alcohol replacement efficiency.

The internal temperature of the tower type apparatus is typically 40° C. to 160° C., preferably 60° C. to 150° C., more preferably 70° C. to 140° C. If the temperature is too low, the EVOH solution has a higher viscosity in the apparatus, thereby reducing the replacement efficiency. If the temperature is too high, on the other hand, the EVOH is liable to be degraded.

The internal pressure of the tower type apparatus is typically 0 to 1 MPaG, preferably 0 to 0.6 MPaG, more preferably 0 to 0.3 MPaG. If the pressure is too low, the replacement efficiency is reduced. If the pressure is too high, the internal temperature of the apparatus is liable to be increased, leading to thermal degradation of the EVOH.

The EVOH water/alcohol solution thus prepared is brought into contact with water with stirring in the agitator container in the next step, whereby the alcohol is replaced with water. As the alcohol content is reduced, water is released from the EVOH. Thus, a lower water content EVOH composition is provided.

The shape of the container to be used in this step is not particularly limited, as long as the container includes an agitator. The container desirably further includes temperature regulating means such as a jacket, and is desirably sealable to be kept in a pressurized state.

The shape of an agitation impeller of the agitator is not particularly limited, as long as the high viscosity EVOH composition can be stirred. Examples of the agitation impeller include a paddle impeller, a double helical ribbon impeller, an anchor impeller, a propeller impeller and a Max-blend impeller. The stirring may be either continuous or intermittent.

The water may be continuously or intermittently fed into the container, and the water may be hot water or water vapor. The feeding of an excessively small amount of water reduces the alcohol replacement efficiency. On the other hand, the feeding of an excessively great amount of water is uneconomical, because the feed-out rate of the water to be fed out of the container is not compatible with the feed-in rate of the water. The water feed-in rate is typically 20 to 300 parts by weight/hr, preferably 40 to 200 parts by weight/hr, more preferably 50 to 100 parts by weight/hr, based on 100 parts by weight of the EVOH fed into the container.

The water fed into the container is fed out together with the alcohol released from the resin. Exemplary methods for feeding out the water include a method in which the water is caused to overflow from the top of the container, and a method in which the water is fed out in the form of a water/alcohol vapor mixture. These methods are preferably employed in combination.

The internal temperature of the container is typically 40° C. to 140° C., preferably 60° C. to 120° C., more preferably 80° C. to 100° C. An excessively low temperature reduces the fluidity in the system, so that the transfer of the product to the next step is difficult. On the other hand, an excessively high temperature is not preferred, because the EVOH is liable to be degraded.

The internal pressure of the container is generally an atmospheric pressure, but may be higher than the atmospheric pressure. The internal pressure is typically 0 to 1 MPaG, particularly 0 to 0.6 MPaG, more preferably 0 to 0.3 MPaG. If the pressure is too high, the internal temperature of the container is liable to be increased, leading to thermal degradation of the EVOH.

The EVOH composition provided in this step has a water content of 20 to 100 parts by weight, preferably 20 to 80 parts by weight, more preferably 30 to 50 parts by weight, based on 100 parts by weight of the EVOH. Although the EVOH composition may contain a residual amount of the alcohol, the EVOH composition preferably has an alcohol content of less than 10 parts by weight based on 100 parts by weight of the EVOH.

The water content and the alcohol content of the EVOH composition can be controlled by properly setting various conditions for the alcohol-water replacement in the aforementioned agitator container. Typically, the alcohol content of the EVOH composition in the agitator container is monitored, and the termination of the alcohol-water replacement is preferably determined when the alcohol content becomes less than 10 parts by weight based on 100 parts by weight of the EVOH.

The replacement by the stirring in the container may be a continuous process in which the EVOH water/alcohol solution obtained from the tower type apparatus is continuously fed into the container, or a batch process in which a predetermined amount of the EVOH water/alcohol solution is fed into the container at each time. The batch process may be a single-stage process. Alternatively, the batch process may be a multi-stage process employing a plurality of containers arranged in series. In this case, it is possible to control the retention time and to finely control the resin component. Further, the multi-stage process is advantageous because additives to be described later can be blended in the respective containers.

In the inventive preparation process, the additives are generally added to the EVOH in the step of replacing the alcohol with water with stirring in the agitator container. Thus, the additives can be blended in the EVOH.

For example, additives such as a carboxylic compound, a boron compound and a phosphoric compound may be added to the EVOH for improvement of thermal stability and other qualitative properties. In a conventional EVOH pellet production process, it is a common practice to first pelletize the EVOH, then immerse the resulting pellets in an aqueous solution containing any of the aforementioned additives, and dewater and dry the pellets, whereby the EVOH pellets are allowed to contain the additives. However, this method additionally requires an additive adding step, and it is difficult to control the additive content of the EVOH. Further, the additives are liable to be locally present in the EVOH. In the inventive preparation process, the additives are added in the respective containers as described above, so that the EVOH can quantitatively contain the additives without the need for additionally providing the step of adding the additives.

Exemplary methods for blending the additives include a method in which the additives are added directly to the EVOH water/alcohol mixture solution obtained in the previous step, and a method in which an aqueous solution containing the additives is fed into the system to be brought into contact with the EVOH water/alcohol mixture solution. Particularly, the latter method is preferred.

In this case, the amounts of the respective compounds present in the aqueous solution are properly controlled so that the EVOH to be finally obtained can contain the respective compounds in desired amounts. In the aqueous solution, the carboxylic compound is preferably present in an amount of 10 to 500 ppm, the boron compound is preferably present in an amount of 1 to 50 ppm, and the phosphoric compound is preferably present in an amount of 10 to 50 ppm.

Typically usable as the carboxylic compound is a $C_{2-4}$ carboxylic acid compound, which is preferably monovalent or divalent. Specific examples of the carboxylic acid compound include oxalic acid, succinic acid, benzoic acid, citric acid, acetic acid, propionic acid and lactic acid, among which acetic acid and propionic acid are preferred for costs and availability.

If the carboxylic compound is present in an excessively small amount in the EVOH pellets obtained in the present invention, the EVOH is liable to be colored during the melt-forming. If the amount of the carboxylic compound is too great, the EVOH is liable to have a higher melt viscosity. The amount of the carboxylic compound is typically 10 to 5000 ppm, particularly 30 to 1000 ppm, preferably 50 to 500 ppm.

Examples of the boron compound include boric compounds such as boric acids, boric esters and boric salts, and hydrogenated boron compounds, among which boric acid and boric salts are preferred but not limitative. Specific examples of the boric acids include orthoboric acid, metaboric acid and tetraboric acid. Specific examples of the boric esters include triethyl borate and trimethyl borate. Specific examples of the boric salts include alkali metal salts, alkali earth metal salts of the above boric acids, and borax. Among these compounds, orthoboric acid (hereinafter referred to simply as "boric acid") is preferred. The boron compound is typically present in an amount of 10 to 2000 ppm, particularly preferably 50 to 1000 ppm, on a boron basis in the EVOH pellets obtained in the present invention. If the amount of the boron compound is too small, the effect of improving the thermal stability is insufficient. If the amount of the boron compound is too great, the gelation is liable to occur, resulting in a forming failure.

Examples of the phosphoric compound include phosphoric acid, phosphorous acid and other phosphor containing acids, and salts thereof. The phosphoric salts may be in the form of a monobasic phosphate, a dibasic phosphate or a tribasic phosphate, and their cationic moieties are not particularly limited. Examples of the phosphoric salts include alkali metal salts and alkali earth metal salts. Particularly, sodium dihydrogen phosphate, potassium dihydrogen phosphate, disodium hydrogen phosphate or dipotassium hydrogen phosphate is preferably added as the phosphoric compound. The phosphoric compound is typically present in an amount of 1 to 1000 ppm on a phosphate moiety basis in the EVOH pellets obtained in the present invention. The coloration, the gelation and a fish-eye of a formed product can be suppressed by adding the phosphoric compound in an amount of the aforementioned range. If the amount of the phosphoric compound is too small, the coloration is liable to occur during the melt-forming. If the amount of the phosphoric compound is too great, a formed product is liable to suffer from the gelation and the fish-eye.

The EVOH composition thus prepared is extruded to be solidified into strands in a coagulation bath in the same manner as in the conventional method, and the strands are cut into pellets, which are dried to provide a product. Since the product has a lower water content, efficient processing can be expected.

However, a preferred embodiment taking an advantage of the lower water content is such that the EVOH composition obtained in the present invention is fed into an extruder, melt-kneaded and extruded from the extruder, and then cut to be pelletized, thereby facilitating the production of the EVOH pellets.

Examples of the extruder include a single screw extruder and a twin screw extruder. Particularly, a twin screw extruder with its screws rotatable in the same direction is preferred, because it ensures sufficient kneading by proper shearing. The extruder typically has an L/D ratio of 10 to 80, particularly 15 to 70, preferably 15 to 60. If the L/D ratio is too low, the extrusion is liable to become unstable due to insufficient kneading. If the L/D ratio is too high, on the other hand, unwanted shear heating tends to occur due to excessive shearing.

The screw rotation speed of the extruder is typically 10 to 400 rpm, particularly 30 to 300 rpm, preferably 50 to 250 rpm. If the rotation speed is too low, the extrusion tends to become unstable. If the rotation speed is too high, the resin is liable to be degraded due to shear heating.

The temperature of the resin in the extruder is typically 80° C. to 250° C. Particularly, if it is desired to reduce the water content of the EVOH composition as much as possible, the resin temperature is 120° C. to 250° C., preferably 150° C. to 230° C. in the extrusion step. If the resin temperature is too high, the EVOH is liable to be thermally degraded. If the resin temperature is too low, on the other hand, the EVOH is insufficiently melted and, therefore, is not properly kneaded. For example, this makes it impossible to ensure homogeneous blending of the additives added in the previous step, to properly extrude the EVOH composition, or to sufficiently reduce the water content of the EVOH composition. Therefore, water is liable to remain in the extruded strands or the pellets, thereby resulting in foaming.

If it is desired to maintain the water content at a certain level to possibly suppress the thermal degradation of the EVOH, the resin temperature is kept at 80° C. to 105° C., preferably 85° C. to 100° C., more preferably 90° C. to 100° C.

A method of controlling the resin temperature is not particularly limited, but is typically such that the temperature of the cylinder in the extruder is properly controlled.

Since the EVOH is melt-kneaded in a hydrous state in the extruder, water or water vapor is preferably released from at least one position of the extruder. An arrangement for the release is not particularly limited, but a dewatering hole, a vent or a dewatering slit may be provided in the cylinder of the extruder for the release. Preferred examples of the dewatering slit include a wedge wire dewatering slit and a screen mesh dewatering slit. Examples of the vent include a vacuum vent and an open vent. Particularly, the dewatering slit is preferred, because it permits the release of both the liquid water and the water vapor and is less susceptible to adhesion and leakage of the resin. A plurality of release arrangements may be used. In this case, the same type of release arrangements or different types of release arrangements may be used in combination.

It is also possible to add the additives described above in the extruder. Where the additives are added into the extruder, the adding position is preferably such that the EVOH is in a melted state. The additives are preferably added into the extruder at one or two or more positions.

The forms of the additives are not particularly limited, but the additives may be added in a powdery form, a paste form, or a dispersion form or a solution form with the additives dispersed or dissolved in a liquid. Particularly, the additives are preferably added in the solution form, because the solution form permits homogeneous and quantitative addition. A preferred example of the liquid is water which is easy to handle and safe.

A method of pelletizing the EVOH resin extruded from the extruder is not particularly limited, but an exemplary method is such that the resin composition is extruded into strands from a die, and then the strands are cooled and cut to a proper length. A method for the cooling is not particularly limited, but the cooling may be achieved by bringing the extruded resin into contact with a liquid kept at a temperature lower than the temperature of the resin or by applying cold air to the extruded resin. In the former case, water is preferably used as the liquid. The pellets typically each have a cylindrical shape. Where the resin is later used as a molding/forming material, it is preferred for convenience that the die has an aperture diameter of 2 to 6 mmØ and the strands are cut to a length of about 1 to about 6 mm. It is also preferred to cut the EVOH extruded from the extruder in a molten state in air or in water.

The pellets thus produced by the melt-kneading by the extruder can directly serve as a product, if the pellets are sufficiently dewatered in the extruder. If the pellets are insufficiently dewatered, excess water can be removed in a drying step. A method for the drying is not particularly limited, but preferred examples of the drying method include a stationary drying method and a fluidized drying method. The drying may be achieved in a multi-stage drying step employing different types of drying methods. For the color tone of the pellets, it is particularly preferred to employ the fluidized drying method at the first stage and employ the stationary drying method at the second stage.

In the melt-kneading by the extruder, it is also possible to blend two or more types of EVOH compositions prepared as having different polymerization degrees, different ethylene contents and different saponification degrees in the previous step, and melt-form the resulting blend. It is also possible to add proper amounts of a plasticizer, a lubricant, a stabilizer, a surface active agent, a colorant, a UV absorber, an antistatic agent, a desiccant, a crosslinking agent, a metal salt, a filler and a reinforcement material such as fibers to the EVOH composition, and melt-knead the resulting mixture.

The EVOH pellets thus produced are melt-formed into a film, a sheet, a cup, a bottle or the like by an extrusion method or an injection molding method for use in applications for packages of foodstuffs, medical drugs, industrial chemicals and agricultural chemicals.

EXAMPLES

The present invention will hereinafter be described by way of an example thereof. It should be understood that the present invention be not limited to the example, which may be modified without departing from the scope of the present invention.

In the following examples, "parts" and "%" are based on weight.

Example 1

An EVOH methanol solution containing 100 parts by weight of an EVOH having an ethylene content of 29 mol % and a saponification degree of 99.5 mol % and 400 parts by weight of methanol was continuously fed to the second highest plate from a tower top of a 10-plate tower at a rate of 80 parts by weight/hr, and water vapor was continuously fed from the lowermost plate at a rate of 60 parts by weight/hr, whereby the EVOH methanol solution and the water vapor were brought into counter flow contact with each other in the plate tower. The internal temperature and the internal pressure of the tower were 108° C. and 0.2 MPaG, respectively. Methanol vapor and water vapor were distilled away from the tower top of the plate tower, then condensed in a condenser, and recovered in the form of a water/methanol mixture solution. An EVOH water/methanol mixture solution containing 100 parts by weight of the EVOH, 75 parts by weight of methanol and 75 parts by weight of water was continuously fed out from a tower bottom of the plate tower.

Then, 80 parts by weight of the EVOH water/methanol mixture solution was fed into a container provided with an agitator of a paddle impeller type, and 0.01 part by weight of a boric acid aqueous solution (3 wt %), 0.05 parts by weight of an acetic acid aqueous solution (10 wt %), 0.05 parts by weight of a phosphoric acid aqueous solution (80 wt %) and 0.003 parts by weight of calcium phosphate aqueous solution (1 wt %) based on 100 parts by weight of the EVOH were added to the EVOH water/methanol mixture solution. Further, water vapor was fed into the container at a rate of 60 parts by weight/hr based on 100 parts by weight of the EVOH, and brought into contact with the EVOH water/methanol solution with stirring. The internal temperature and the internal pressure of the container were 100° C. and 0.3 MPaG, respectively. Two hours later, a pasty EVOH composition (containing 100 parts by weight of the EVOH, 43 parts by weight of water and 3 parts by weight of methanol) was provided.

The resulting EVOH composition was continuously fed into a twin screw extruder, and melt-kneaded. The feed rate per hour of the EVOH composition was 4 kg/hr. The specifications of the twin screw extruder were as follows:
L/D: 42
Aperture diameter: 30 mmØ
Screws: Unidirectional complete mesh type
Rotation speed: 90 rpm
Cylinder temperature: 95° C.
Die temperature: 95° C.
Die aperture diameter: 3.5 mmØ

Strands of the EVOH extruded from the extruder were cooled in a water bath, and then cut into EVOH pellets. The pellets had a water content of 18 wt %.

Comparative Example 1

An EVOH water/methanol mixture solution was fed out of the tower type apparatus as in Example 1, and directly fed into the extruder. At this time, a great amount of water was separated from the EVOH water/methanol mixture solution at a feed port of the extruder. With unstable melt-kneading, severance of strands and contamination with foreign matter attributable to thermal degradation were observed.

Industrial Applicability

In the inventive EVOH composition preparation process, it is possible to efficiently remove the alcohol from the EVOH alcohol solution prepared by saponifying the copolymer of ethylene and the fatty acid vinyl ester in the alcohol solvent during the preparation of the EVOH, and to provide the lower water content EVOH composition. This eliminates the need for removing a great amount of water when the composition is melt-kneaded to be pelletized. Therefore, the inventive process is industrially useful with a higher processing rate.

The invention claimed is:

1. A process for preparing ethylene-vinyl alcohol copolymer composition comprising the steps of:
feeding an alcohol solution of an ethylene-vinyl alcohol copolymer into a tower type apparatus, the ethylene-vinyl alcohol copolymer alcohol solution comprising 100 parts by weight of the ethylene-vinyl alcohol copolymer and not less than 300 parts by weight of an alcohol having a carbon number of not greater than 4;
bringing the ethylene-vinyl alcohol copolymer alcohol solution into contact with water, and feeding out a part of the alcohol together with water from the apparatus to provide a water/alcohol mixture solution of the ethylene-vinyl alcohol copolymer comprising 100 parts by weight of the ethylene-vinyl alcohol copolymer, 20 to 200 parts by weight of the alcohol and 50 to 200 parts by weight of water; and
bringing the ethylene-vinyl alcohol copolymer water/alcohol mixture solution into contact with water in an agitator container with stirring, and feeding out at least a part of the alcohol from the container to provide an ethylene-vinyl alcohol copolymer composition comprising 100 parts by weight of the ethylene-vinyl alcohol copolymer, less than 10 parts by weight of the alcohol and 20 to 100 parts by weight of water.

2. A process for preparing ethylene-vinyl alcohol copolymer composition as set forth in claim 1, wherein the alcohol is methanol.

3. A process for preparing ethylene-vinyl alcohol copolymer composition as set forth in claim 2, wherein the tower type apparatus is a plate tower.

4. A process for preparing ethylene-vinyl alcohol copolymer composition as set forth in claim 3, wherein at least one additive selected from the group consisting of a carboxylic compound, a boron compound and a phosphoric compound is present in the agitator container, and the ethylene-vinyl alcohol copolymer composition comprises the additive.

5. The process of claim 4, further comprising the steps of:
melt-kneading said ethylene-vinyl alcohol copolymer composition in an extruder;
extruding the kneaded ethylene-vinyl alcohol copolymer composition; and
cutting the extruded ethylene-vinyl alcohol copolymer composition.

6. A process for preparing ethylene-vinyl alcohol copolymer composition as set forth in claim 1, wherein the tower type apparatus is a plate tower.

7. A process for preparing ethylene-vinyl alcohol copolymer composition as set forth in claim 1 wherein at least one additive selected from the group consisting of a carboxylic compound, a boron compound and a phosphoric compound is present in the agitator container, and the ethylene-vinyl alcohol copolymer composition comprises the additive.

8. A process for preparing ethylene-vinyl alcohol copolymer composition as set forth in claim 2 wherein at least one additive selected from the group consisting of a carboxylic compound, a boron compound and a phosphoric compound is present in the agitator container, and the ethylene-vinyl alcohol copolymer composition comprises the additive.

9. A process for preparing ethylene-vinyl alcohol copolymer composition as set forth in claim 6 wherein at least one additive selected from the group consisting of a carboxylic compound, a boron compound and a phosphoric compound is present in the agitator container, and the ethylene-vinyl alcohol copolymer composition comprises the additive.

10. The process of claim 1, further comprising the steps of:
melt-kneading said ethylene-vinyl alcohol copolymer composition in an extruder;
extruding the kneaded ethylene-vinyl alcohol copolymer composition; and
cutting the extruded ethylene-vinyl alcohol copolymer composition.

11. The process of claim 2, further comprising the steps of:
melt-kneading said ethylene-vinyl alcohol copolymer composition in an extruder;
extruding the kneaded ethylene-vinyl alcohol copolymer composition; and
cutting the extruded ethylene-vinyl alcohol copolymer composition.

12. The process of claim 3, further comprising the steps of:
melt-kneading said ethylene-vinyl alcohol copolymer composition in an extruder;
extruding the kneaded ethylene-vinyl alcohol copolymer composition; and
cutting the extruded ethylene-vinyl alcohol copolymer composition.

13. The process of claim 8, further comprising the steps of:
melt-kneading ethylene-vinyl alcohol copolymer composition in an extruder;

extruding the kneaded ethylene-vinyl alcohol copolymer composition; and cutting the extruded ethylene-vinyl alcohol copolymer composition.

14. The process of claim 9, further comprising the steps of:

melt-kneading said ethylene-vinyl alcohol copolymer composition in an extruder;

extruding the kneaded ethylene-vinyl alcohol copolymer composition; and cutting the extruded ethylene-vinyl alcohol copolymer composition.

\* \* \* \* \*